United States Patent Office 2,801,436
Patented Aug. 6, 1957

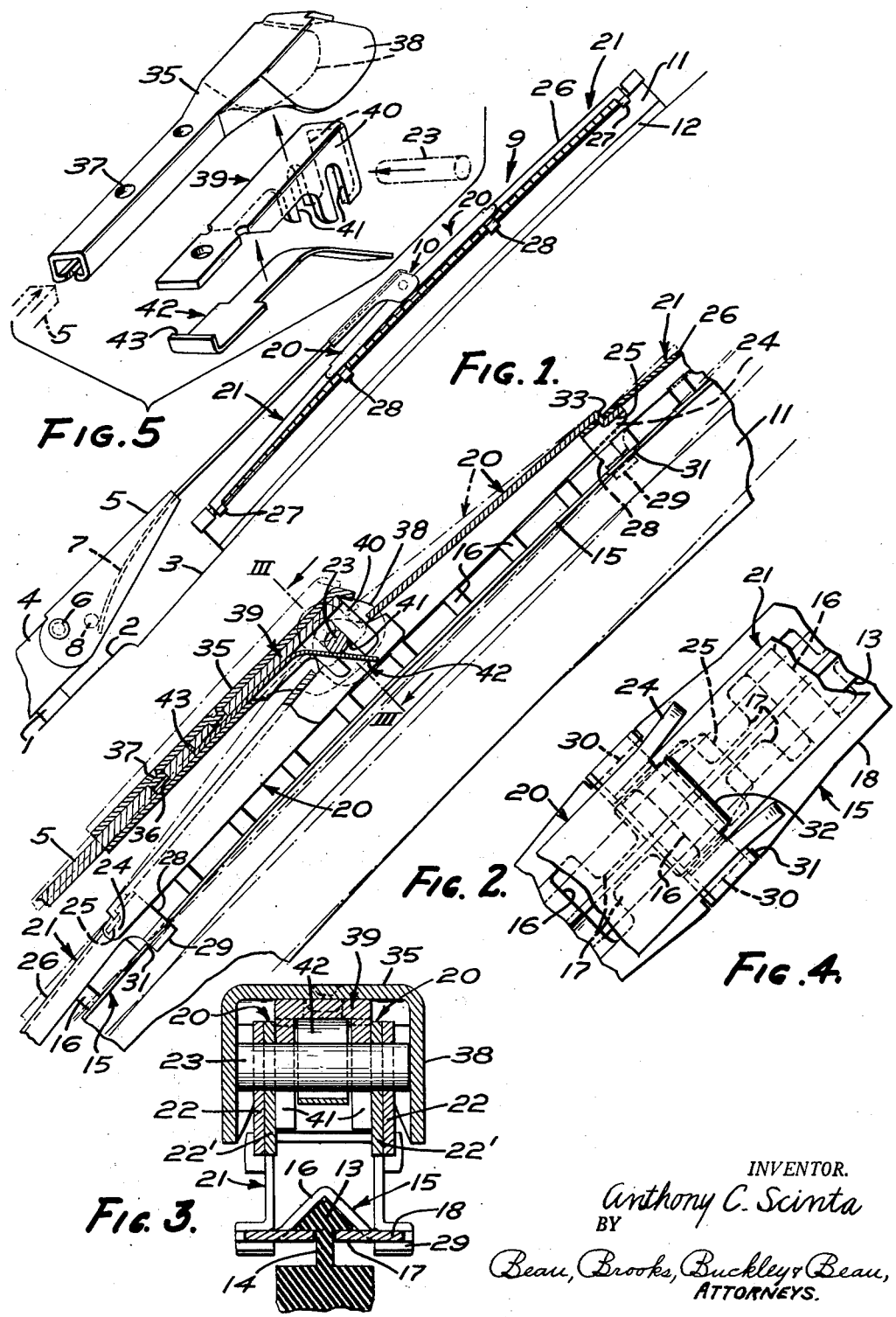

2,801,436

WINDSHIELD WIPER BLADE

Anthony C. Scinta, Buffalo, N. Y., assignor to Trico Products Corporation, Buffalo, N. Y.

Application September 29, 1953, Serial No. 382,929

9 Claims. (Cl. 15—245)

This invention relates generally to the window cleaning art, and more particularly to a new and useful wiper blade useable on both flat and curved window surfaces while being particularly adapted for use on curved vehicle windows.

The problem of effectively wiping a curved window surface has not been completely satisfactorily solved by the several prior art blades which have heretofore been used for this purpose. This problem is complicated not only by the varying window curvature itself but also by the peculiar airstream action produced thereby, and is of ever increasing importance and difficulty because of the adoption of vehicle windows having surfaces of greater and greater curvature and more deeply receding side portions. The wiper must effectively reach around into and wipe such receding side portions, must not require actuating power beyond that which can be effectively delivered thereto, and should provide proper distribution of wiping pressure while avoiding undue distortion of the blade body.

Accordingly, it is an object of this invention to provide a wiper blade which will effectively wipe present day and contemplated curved window surfaces.

Another object of this invention is to provide a vehicle window wiper blade that will effectively wipe all portions of a curved window surface lying within its wiping path.

It is also an object of this invention to provide a wiper blade adapted for curved window surfaces having means for automatically adjusting the wiping pressure distribution therealong according to the window surface curvature to effectively wipe the window surface.

In addition it is an object of this invention to provide a wiper blade particularly adaptel for curved vehicle windows and having means for automatically applying wiping pressure adjacent the opposite ends thereof sufficient to effectively accommodate receding window surface areas.

Still another object of this invention is to provide a wiper blade having means for increasing the wiping pressure at the opposite ends thereof without correspondingly increasing the wiper pressure adjacent the center portions thereof and instead simultaneously decreasing the center portion pressure, in order to effectively accommodate a curved window surface without unduly distorting the blade body.

A further object of this invention is to provide a practical wiper blade having the aforesaid characteristics and which is relatively inexpensive to manufacture, simple and compact in construction, and reliable in operation.

A wiper blade according to this invention is characterized by the provision, in combination with a flexible blade body and a resilient backing providing lateral support therefor, of a pressure distributing superstructure having end levers spanning the opposite end portions of said blade body and secured at their inner ends against endwise displacement outwardly along said blade body, together with toggle levers spanning the intermediate portion of said blade body and adapted for attachment to an actuating arm, said toggle levers being connected to said end levers intermediate the opposite ends thereof to deliver endwise pressure thereagainst.

The foregoing and other objects will become more readily apparent and a clear understanding of the invention will be had from the ensuing detailed description having reference to the accompanying drawing illustrating a preferred embodiment of the invention and wherein:

Fig. 1 is a view in side elevation of a window wiper unit mounted in place adjacent a vehicle window and incorporating a wiper blade and coupler according to the instant invention;

Fig. 2 is an enlarged fragmentary view, partly in section, of the blade and coupler of Fig. 1;

Fig. 3 is a transverse sectional view taken about on line III—III of Fig. 2;

Fig. 4 is a fragmentary plan view of a detail of the blade of Fig. 1; and

Fig. 5 is an exploded view of the coupler of Fig. 1.

Referring now more in detail to the accompanying drawing, and particularly to Fig. 1 thereof, there is illustrated a rock shaft 1 extending through the vehicle cowl 2 adjacent the lower edge of the windshield 3. The wiper actuating arm has an inner end 4 secured to the outer end of rock shaft 1 in a conventional manner for being oscillated thereby, and an outer end 5 pivoted to the inner end 4 at 6, there being provided a conventional spring 7 bearing against a pin 8 for providing arm spring pressure to the wiper blade, generally designated 9. The wiper blade is secured to the arm end 5 by a coupling generally designated 10.

Turning now to the particular wiper blade construction, the same comprises an elongated flexible body and a resilient backing therefor, together with a particular pressure distributing superstructure arrangement. Thus, there is shown an elongated flexible blade body 11 provided along one longitudinal margin thereof with a wiping lip 12 and provided along its opposite longitudinal margin with a backing portion 13 of generally triangular cross section connected to the main body portion by a relatively thin web or neck portion 14. A resilient backing strip 15 comprising spaced triangular shaped arched bridge portions 16 and intervening inwardly extending opposed tabs 17 is fitted to body 11 to embrace the backing portion 13 thereof, and said backing strip is provided with laterally extending flange portions 18 for connection to the pressure distributing superstructure as will be described. The particular blade body and backing strip construction as thus described is of known form, being disclosed more fully for example in copending application Ser. No. 161,086, now Patent No. 2,687,544 and many various conventional blade body and backing strip constructions can be utilized in a wiper blade construction according to this invention, the primary requirement being that there be a blade body which is laterally reinforced while being resiliently backed and flexible in a direction normal to the window surface.

The main problem in curved window wiper blade construction is to provide for proper distribution of wiping pressure throughout the length of the blade body to enable conformance of the wiping lip to a curved surface for effectively wiping the same. In accord with this invention, this problem is effectively solved by means of a pressure distributing superstructure having a construction in the nature of a toggle joint bearing outwardly against end levers secured at their inner ends against outward movement relative to the blade body. For example, in the preferred embodiment disclosed herein the pressure distributing superstructure comprises a pair of toggle levers 20 and a pair of end levers 21.

Toggle levers 20 are of inverted channel form each provided at its inner end with a pair of spaced apart apertured ears 22 and 22', the latter being inwardly offset, and said ears are arranged in overlapping relation with the offset ears overlapping the other ears to provide a smooth and compact joint construction, as clearly illustrated in Fig. 3. A pivot pin 23 is fitted through the ear apertures and secured therein in a known manner whereby said toggle levers 20 are pivotally connected adjacent their inner ends.

Toggle levers 20 are each provided at their outer ends with outwardly diverging side wall portions 24 and the top wall portions thereof are formed to provide stepped tabs 25.

End levers 21 each comprise an elongated leg portion 26 of inverted channel form and a relatively short leg portion 28 extending at slightly less than a right angle thereto. Legs 26 span the outer end portions of the blade body and are provided at their outer ends with straddling feet 27 embracing the lateral flange portions 18 of backing 15 for limited sliding movement therebetween. Legs 28 are provided with straddling feet 29 embracing the backing flange portions 18 and fitting into notched enlargements 30 thereon, as illustrated in Figs. 3 and 4, to preclude movement of feet 29 outwardly along the blade body, the edge 31 of the notches acting as a fulcrum as will be more fully described.

The outer ends of toggle levers 20 are connected to end levers 21 adjacent the angle formed by the leg portions thereof. To this end, levers 21 are each provided adjacent said angle with a cut-out portion 32 through which the tabs 25 are slip-fitted so that the risers 33 thereof are fitted in said cut-out portions with the tabs extending within the channeled legs 26. This is a limited pivotal connection and the positioning of cut-out portions 32 is such that the risers 33 bear outwardly against leg portions 26 at a position directly above the fulcrum point 31 when the blade body is flat.

In operation, toggle levers 20 function as a toggle joint so that when a pressure force normal to the windshield is applied thereto at the pivot pin 23 the levers 20 tend to move into alinement exerting an endwise pressure against end levers 21. Fig. 2 illustrates in broken lines the position of the various blade parts prior to curving of the blade body and which they would assume on a flat window surface, and it will be observed that upon the application of arm spring pressure to pivot pin 23, which pressure is applied thereto in a direction substantially normal to the surface of window 3, this pressure will be transmitted to end levers 21 by toggle levers 20 in the form of a vertical component on feet 29 and an endwise component causing levers 21 to pivot around fulcrum 31. The flat window surface resists this pivoting tendency resulting in wiping pressure at the outer ends of the blade body. Thus, wiping pressure is directly applied to the blade body at the outer ends thereof and at spaced intermediate points therealong, and is distributed throughout the length of the blade body by the resilient backing. When the window surface is curved, toggle levers 20 move closer to alinement causing said levers to exert an endwise thrust against levers 21 where risers 33 abut the walls of cut-out portions 32 and because levers 21 are pivoted to the backing against fulcrum 31 this endwise thrust causes levers 21 to pivot about fulcrum 31, as illustrated by full lines in Fig. 2, with the outer ends of levers 21 exerting a downward force on the outer ends of the blade body to cause the same to conform to the curved surface, all as illustrated by the full line showing of Fig. 2.

Also, it will be observed that upon pivoting of end levers 21 the pressure of straddling feet against the backing at fulcrum point 31 tends to stretch the intermediate portion of the blade body and backing, causing that portion also to better conform to a curved window surface.

In addition, it will be noted that with the blade body in straight or flat position, which position is normally assumed because of the resilient backing, the toggle levers 20 extend at a considerable angle to each other whereby upon the application of arm spring pressure to the knee of the toggle joint there is a predetermined vertical component in the pressure force transmitted by the toggle levers to the end levers, this force component then being transmitted through the relatively short legs of the end levers to the blade body, and a predetermined endwise component transmitted by the end levers to the outer ends of the blade, whereby predetermined wiping pressure is applied to the blade body at spaced points therealong including spaced intermediate points as well as the opposite end portions, and it will be appreciated that by proper design of the toggle joint and end levers and by proper selection of the arm spring pressure this initial wiping pressure as for a relatively flat window surface can be selectively varied. When a curved window surface requires curving of the blade body, the toggle joint knee moves closer to the blade body with the toggle levers moving closer to alinement causing the vertical component of the arm spring pressure to decrease and the endwise component thereof to increase, whereby greater pressure is applied at the ends of the blade body and lesser pressure is applied at the intermediate portions thereof. In this way, surface conformance is effected while undue distortion of the intermediate blade body portion is avoided. Therefore, a wiper blade construction according to this invention provides for efficient distribution of wiping pressure along the blade in a manner to compel surface conformance thereof, and varies the pressure distribution in accord with variations in surface curvature to obtain the most effective pressure distribution.

As previously noted, the toggle levers preferably are linked to the end levers in vertical alinement with the fulcrum points when the blade body is in flat condition whereby to provide the most efficient action because no force is wasted in moving the end levers past dead center as would be the case were the toggle levers linked to the end levers at points inwardly of the fulcrum points.

Thus, a wiper blade according to this invention provides a unique and highly effective action particularly adapted for curved window surfaces.

This invention also comprehends a novel wiper blade attaching clip or coupling for securing the same to an actuating arm, which coupling is particularly adapted for use with a wiper blade according to the instant invention.

In accord with this invention, there is provided a clip adapted to be carried on the outer end of the actuating arm, said clip comprising a housing or shield member 35 of inverted channel form. At the inner end portion of member 35 the side walls thereof are turned inwardly to form a clamp portion embracing the outer end 5 of the arm and member 35 is secured thereto by forming an opening 36 adjacent the outer end of the arm and forming a detent 37 on member 35 fitting in opening 36. At its outer end portion, housing member 35 is provided with enlarged spaced apart depending side walls 38, which side walls are adapted to embrace the knee of the toggle joint as illustrated in Fig. 3.

A lock member 39 has an elongate flat body portion fitted into the clamp portion of housing 35 in alinement with and closely adjacent to the outer arm end and is secured therein in the same manner as the arm by forming an opening through lock member 39 and a detent in housing 35 to extend into said opening. At its outer end, lock member 39 is provided with laterally spaced depending parts 40 positioned between side walls 38 and each formed in its bottom surface with a recess 41 of inverted U-shape. Recesses 41 are alined transversely of the arm and are adapted to receive and embrace therein pivot pin 23.

A locking spring 42 is provided to retain pin 23 within recesses 41, and comprises a leaf spring member extending along the undersurface of lock member 39 and formed at the inner end thereof with an upturned tab 43 fitted between the outer arm end and the inner end of lock member 39, being locked therebetween within housing 35. At its opposite end, spring 42 is formed to extend downwardly and outwardly between depending parts 40 from adjacent the inner ends of recesses 41 thereacross to adjacent the outer end thereof whereby to close off said recesses.

In this way, there is provided a readily assembled and extremely practical coupling enabling pivotal and separable connection of the arm to the blade, the parts being connected by pushing pin 23 in a direction inwardly along the arm to force the outer end of spring 42 rearwardly whereby to open and expose the outer end of recesses 41, whereupon pin 23 can be slipped into said recesses. Spring 42 is resilient and upon being released will spring back to its original form to resiliently urge pin 23 against the inner end of recesses 41 and to retain pin 23 therein, as clearly illustrated in Fig. 2.

A coupler construction according to this invention precludes accidental disengagement of the blade from the arm. To remove the blade from the arm pin 23 is forced downwardly toward the outer end of recesses 41 and against the action of spring 42, this action being the exact reverse of the pressure action normally occurring between the coupler and the blade when in use. In other words, the spring arm pressure is exerted in a direction substantially diametrically opposed to the force direction required to separate the blade from the arm. Even when the blade is lifted back as when manually cleaning the window the pin will simply pivot within recesses 41.

Accordingly, it will be seen that a wiper blade and coupler according to the instant invention fully accomplishes the aforesaid objects. While but a single preferred embodiment is disclosed herein, it will be appreciated that the invention is not necessarily limited to the details thereof and it is intended that this invention be defined by the scope of the appended claims.

Having fully disclosed and completely described this invention, together with its mode of operation, what I claim as new is:

1. A wiper blade comprising a flexible blade body, end levers spanning the opposite end portions of said blade body and each having a relatively long leg connected to said blade body adjacent one end thereof and a relatively short leg connected to said blade body intermediate the opposite ends thereof and fixed against outward sliding movement therealong, a pair of levers spanning the intermediate portion of said blade body and having their outer ends connected to said end levers, and means adapted for connection to an actuating arm and connecting said pair of levers for causing the same to deliver an endwise thrust to said end levers upon the application of arm spring pressure.

2. A wiper blade comprising, in combination with an elongate flexible blade body and a resilient backing secured thereto, pressure distributing superstructure therefor comprising dual toggle levers pivotally interconnected adjacent one end thereof and adapted for connection to an actuating arm, end levers pivotally connected intermediate their opposite ends to the opposite ends of said toggle levers, the opposite ends of said end levers being connected to said backing, and means restraining the inner end of each of said end levers against outward movement lengthwise of said blade body, whereby said toggle levers are adapted to deliver an endwise thrust tending to pivot said end levers about their inner ends.

3. A wiper blade comprising an elongate and resiliently backed flexible blade body, a pair of end levers each comprising a relatively short leg and a relatively long leg extending at an angle thereto, means securing said relatively short legs to said blade body at spaced points intermediate the opposite ends thereof and against movement outwardly therealong with said relatively long legs spanning the end portions of said blade body and connected thereto adjacent the opposite ends thereof, and a toggle joint adapted for connection to an actuating arm spanning the intermediate portion of said blade body and having its outer ends connected to said end levers adjacent the juncture of the legs thereof.

4. A wiper blade comprising, in combination with a resiliently backed blade body, a pair of end levers spanning the opposite end portions of said blade body and having their opposite ends connected thereto, a pair of toggle levers spanning the intermediate portion of said blade body and pivotally interconnected adjacent their inner ends, said toggle levers being adapted for connection to an actuating arm and being connected adjacent their outer ends to said end levers, and fulcrum means engaging the inner ends of said end levers for causing the same to pivot thereabout as arm spring pressure is applied to said toggle levers, said toggle levers being connected to said end levers at points in substantial alinement with said fulcrum means at substantially right angles to said blade body when said blade body is in lengthwise alinement.

5. A wiper blade adapted for use on curved window surfaces comprising, in combination, an elongated flexible blade body having a wiping lip along one longitudinal margin thereof, laterally rigid resilient backing means secured along the opposite longitudinal margin of said blade body, a first pair of levers pivotally interconnected at their inner ends about a transverse axis and adapted for connection to an actuating arm, a second pair of levers each spanning an end portion of said blade body and each pivotally connected adjacent its inner end to the adjacent outer end of said first pair of levers, and means connecting said second pair of levers to said blade body with the inner ends of said second pair of levers being fixed against outward sliding movement lengthwise of said blade body and with the pivotally connected ends of said first pair of levers normally being more remote from said blade body than the outer ends thereof, whereby said first pair of levers function as a toggle joint pivoting the outer ends of said second pair of levers toward said blade body upon the application of arm pressure to said toggle joint.

6. A wiper blade comprising, in combination with an elongated flexible blade body, an end lever having a relatively short leg connected to said blade body at a point spaced from the ends thereof and a relatively long leg spanning an end portion of said blade body and connected thereto adjacent one end thereof, said relatively short leg being fixed against outward movement toward said one blade body end, a toggle joint adapted for connection to an actuating arm and having one outer end connected to said end lever for delivering an endwise thrust to said relatively long leg, and means connecting the other outer end of said toggle joint to said blade body.

7. A windshield cleaner comprising, in combination, a wiper blade having an elongated flexible blade body, a pair of toggle levers spanning the intermediate portion of said blade body, connecting pin means pivotally interconnecting the adjacent ends of said toggle levers to form therewith a toggle joint, end levers spanning the opposite end portions of said blade body and connected to the outer ends of said toggle levers, and means fixing the inner ends of said end levers against outward movement lengthwise of said blade.

8. A wiper blade adapted for use on curved window surfaces comprising, in combination, an elongated flexible blade body, a pair of end levers spanning the opposite end portions of said blade body and each having a relatively long leg connected to said blade body adjacent one end thereof and a relatively short leg connected to said blade body intermediate the opposite ends thereof and fixed against outward sliding movement therealong, a pair of toggle levers spanning the intermediate portion of said blade body and connected at their outer ends to said end levers, and connecting pin means adapted for connection to an actuating arm extending transversely of said blade body and pivotally interconnecting the inner ends of said toggle levers for causing the same to deliver an endwise thrust to said end levers upon the application of arm spring pressure.

9. A wiper blade adapted for use on curved window surfaces comprising, in combination, an elongated flexible blade body, a pair of end levers spanning the opposite end portions of said blade body and each having a relatively long leg connected to said blade body adjacent one end thereof and a relatively short leg connected to said blade body intermediate the opposite ends thereof and fixed against outward sliding movement therealong, a pair of toggle levers spanning the intermediate portion of said blade body and connected at their outer ends to said end levers, the inner ends of said toggle levers being formed to provide spaced apart apertured ears with the ears of one toggle lever overlapping the ears of the other thereof when said toggle levers are in assembled relation, and connecting pin means adapted for connection to an actuating arm extending transversely of said blade body and pivotally interconnecting the overlapping ears of said toggle levers.

References Cited in the file of this patent

UNITED STATES PATENTS

| | | |
|---|---|---|
| 2,087,686 | Horton | July 20, 1937 |
| 2,443,113 | Nesson | June 8, 1948 |
| 2,596,063 | Anderson | May 6, 1952 |
| 2,651,800 | Picon | Sept. 15, 1953 |
| 2,741,792 | Ehrlich et al. | Apr. 17, 1956 |